United States Patent
Bastian, II

(10) Patent No.: US 9,950,881 B2
(45) Date of Patent: Apr. 24, 2018

(54) ROBOTIC TRAILER LOADING DEVICE WITH TELESCOPING ROBOT

(71) Applicant: Bastian Solutions, LLC, Indianapolis, IN (US)

(72) Inventor: William A. Bastian, II, Carmel, IN (US)

(73) Assignee: Bastian Soluitons, LLC, Indianapolis, IN (US)

(*) Notice: Subject to any disclaimer, the term of this patent is extended or adjusted under 35 U.S.C. 154(b) by 630 days.

(21) Appl. No.: 14/478,557

(22) Filed: Sep. 5, 2014

(65) Prior Publication Data

US 2016/0068357 A1 Mar. 10, 2016

(51) Int. Cl.
*B60P 3/00* (2006.01)
*B65G 67/20* (2006.01)
*B65G 61/00* (2006.01)

(52) U.S. Cl.
CPC ............. *B65G 67/20* (2013.01); *B60P 3/00* (2013.01); *B65G 61/00* (2013.01)

(58) Field of Classification Search
CPC ............ B65G 61/00; B65G 67/20; B60P 3/00
See application file for complete search history.

(56) References Cited

U.S. PATENT DOCUMENTS

| | | | | |
|---|---|---|---|---|
| 2,973,073 A * | 2/1961 | Elliott | ....................... | B64D 9/00 193/35 SS |
| 5,009,560 A * | 4/1991 | Ruder | .................... | B65G 67/08 198/588 |
| 5,015,145 A | 5/1991 | Angell et al. | | |
| 5,176,485 A * | 1/1993 | Ruder | .................... | B65G 67/08 414/392 |
| 5,297,924 A * | 3/1994 | Neri | ....................... | B65G 61/00 209/583 |
| 5,391,038 A | 2/1995 | Stewart | | |
| 5,403,142 A | 4/1995 | Stewart | | |

(Continued)

FOREIGN PATENT DOCUMENTS

EP 2 570 372 A1 3/2013
EP 1 885 636 B1 4/2013

(Continued)

OTHER PUBLICATIONS

Bastian Solutions. New Concepts—Robotic Trailer Loading. Jul. 6, 2011. 1 page screenshot of video. [online], [retrieved on Sep. 5, 2014] Retrieved from YouTube.com using Internet <URL:https://www.youtube.com/watch?v=H-Hw-9uoE_s>.

(Continued)

*Primary Examiner* — Anna M Momper
*Assistant Examiner* — Ashley K Romano
(74) *Attorney, Agent, or Firm* — Woodard, Emhardt, Moriarty, McNett & Henry LLP

(57) ABSTRACT

A cargo handling system includes a gantry and a robot arm. The gantry is configured to move from a retracted position to an extended position. The robot arm hangs from the gantry. The robot arm is configured to move along the gantry at least when the gantry is in the extended position. The robot arm is configured to handle one or more cargo items. A conveyor is configured to move from a retracted position to an extended position. The conveyor is configured to transport the cargo items to and/or from the robot arm.

34 Claims, 12 Drawing Sheets

(56) References Cited

U.S. PATENT DOCUMENTS

| | | | |
|---|---|---|---|
| 5,794,416 A | 8/1998 | Rahman | |
| 7,967,543 B2 | 6/2011 | Criswell et al. | |
| 8,172,071 B2 | 5/2012 | Schaefer | |
| 8,562,277 B2 | 10/2013 | Criswell | |
| 2007/0160449 A1* | 7/2007 | Girn | B65G 67/02 |
| | | | 414/390 |
| 2009/0067953 A1 | 3/2009 | Schenning | |
| 2011/0139576 A1 | 6/2011 | Johanssen | |
| 2012/0253507 A1* | 10/2012 | Eldershaw | B65G 47/00 |
| | | | 700/218 |

FOREIGN PATENT DOCUMENTS

| | | |
|---|---|---|
| WO | WO 1999/046195 A1 | 9/1999 |
| WO | WO 2006/121329 A1 | 11/2006 |

OTHER PUBLICATIONS

Teun. The best way to unload a container . . . Nov. 17, 2009. 1 page screenshot of video. [online], [retrieved on Sep. 5, 2014] Retrieved from YouTube.com using Internet <URL:https://www.youtube.com/watch?v=Mc-IC1yclgU>.

Wynright Corporation. Fluid Load RTL Loading. Jan. 13, 2012. 1 page screenshot of video. [online], [retrieved on Sep. 5, 2014] Retrieved from Vimeo.com using Internet <URL:http://vimeo.com/35019088>.

Wynright Corporation. Fluid Unload RTL Unloading. Jan. 9, 2012. 1 page screenshot of video. [online], [retrieved on Sep. 5, 2014] Retrieved from Vimeo.com using Internet <URL:http://vimeo.com/34806951>.

Wynright Corporation. RTL Mixed Case Simulation. Dec. 12, 2012. 1 page screenshot of video. [online], [retrieved on Sep. 5, 2014] Retrieved from Vimeo.com using Internet <URL:http://vimeo.com/55445160>.

Wynright Corporation. RTL Robotic Truck Loading. Dec. 12, 2012. 1 page screenshot of video. [online], [retrieved on Sep. 5, 2014] Retrieved from Vimeo.com using Internet <URL:http://vimeo.com/55451735>.

Wynright Corporation. RTL—Tire Loading. Dec. 12, 2012. 1 page screenshot of video. [online], [retrieved on Sep. 5, 2014] Retrieved from Vimeo.com using Internet <URL:http://vimeo.com/55457869>.

Wynright Corporation. RTU Mixed Case. Feb. 11, 2013. 1 page screenshot of video. [online], [retrieved on Sep. 5, 2014] Retrieved from Vimeo.com using Internet <URL:http://vimeo.com/59409850>.

Wynright Corporation. RTU Robotic Truck Unloading. Dec. 12, 2012. 1 page screenshot of video. [online], [retrieved on Sep. 5, 2014] Retrieved from Vimeo.com using Internet <URL:http://vimeo.com/55458633>.

Wynright Corporation. RTU Window View. Feb. 11, 2013. 1 page screenshot of video. [online], [retrieved on Sep. 5, 2014] Retrieved from Vimeo.com using Internet <<URL:http://vimeo.com/59409853>.

YouTube. 1 page screenshot of video. [online], [retrieved on Sep. 5, 2014] Retrieved from YouTube.com using Internet <URL:https://www.youtube.com/watch?v=oF39_Rw8oQs>.

* cited by examiner

ROBOTIC TRAILER LOADING DEVICE WITH TELESCOPING ROBOT

BACKGROUND

Loading and unloading packages, boxes, products, and/or other cargo items from the cargo spaces in trucks, trailers, semi-trailers, flat beds, cargo carriers, and the like can be quite expensive, labor-intensive, and even dangerous at times. Forklift trucks have been used to load pallets of items to and from semi-trailers, but there are a number of limitations on their use. For example, semi-trailers have been known to dislodge from loading docks which can be especially dangerous for forklift truck operators. Notably, one danger is trailer creep (also called "trailer walk" or "dock walk"), which occurs when the lateral and vertical forces exerted each time a forklift truck enters and exits the semi-trailer causes the semi-trailer to slowly move away from the dock. Eventually, the forklift may fall into the resulting gap caused by this separation of the semi-trailer from the dock leveler. Moreover, the pallets typically do not fill the entire cargo space such that there is still a significant amount of empty space. This wasted empty space costs money. Loading dock personnel have been used to manually unload and stack items within the cargo space, but such labor intensive activities can be quite expensive and can result in injury to the personnel.

Robotic and other automated systems have been proposed for loading and unloading cargo, but these systems still have a number of significant drawbacks. In a large number of automated or robotic systems, the majority of the weight of the robot as well as any ancillary conveyor equipment is supported by the floor of the semitrailer or other cargo space. Some semitrailers are unable to support such a heavy load, and even when it can support the weight, the movement of the robot as well as other equipment into the cargo space can result in dangerous trailer creep. Moreover, semi-trailers are sometimes not perfectly level and can be prone to shaking or even tipping as the relatively heavy robotic equipment moves. This shaking can lead to cargo being dislodged or falling down from the stack. During shipping as well as even loading by the robot, items can become shifted (e.g., boxes are tipped over); as such they are unable to be easily handled by robotic equipment. Consequently, human assistance is needed to stack or unload the shifted cargo items. By the automated robotic system occupying a significant amount of floor space, the human operator is unable to work alongside the robot. As a result, the robotic equipment has to be removed from the cargo space in order to allow the human operator access to the cargo. This in turn slows down the loading or unloading process. Moreover, other automated and robotic systems utilize a configuration similar to a forklift truck such that the system is unable to individually stack the cargo within the cargo space. With such a system, the cargo cannot be efficiently packed within the cargo space.

Thus, there is a need for improvement in this field.

SUMMARY

To address the above-discussed issues as well as other issues, a cargo handling system has been designed that includes a robot arm hanging on an extendable or telescoping gantry. During use, the gantry is extended into a truck, semi-trailer, shipping container, or other cargo space. The robot arm is then able to move along the gantry within the cargo space to load and unload boxes or other cargo items to or from a conveyor that is likewise extendable into the cargo space. This construction frees up space on the floor so that a human operator can come in and assist in stacking or unstacking cargo from the cargo space, if required. Moreover, this robotic gantry system is less susceptible to movement of the trailer because the weight of the robot is not supported by the trailer itself. To further support or stabilize the robot arm, the gantry can include vacuum cups that adhere to the ceiling and/or the sidewalls of the cargo space. In another example, the gantry structure is extended just above the floor level with idler casters to help stabilize the robot. In this configuration the robot would be upright rather than inverted. The weight of the gantry is counterbalanced within the warehouse, plant, or other structure by additional support beams and/or weights. Stabilization can further be enhanced by making all or part of the gantry and robot arm from lightweight materials, like aluminum and carbon fiber materials. In one example, at least one pair of the support beams is integrated into the wall of the loading dock door so as to free up loading space in the warehouse. In another variation, the gantry is vertically movable and tilted so as to accommodate trailers of different heights and dock angles. The robot arm can also be used within a warehouse for staging items for loading or unloading from the semi-trailers. An end of arm tool (EoAT) on the robot can include a mechanism for securing and releasing cargo along with a vision system to properly position the EoAT. Depending on the cargo dimensions, one or more pieces of cargo can be handled by the EoAT simultaneously.

In operation, a semi-trailer or other load carrying vehicle is positioned near a loading bay of a loading dock. The gantry extends into the trailer to a desired initial loading position which is typically at the front end of the trailer. Next, the vacuum cups engage the interior of the trailer to stabilize the gantry and the robot arm. Before, during, or after this stabilization step, the extendable conveyor extends into the trailer. In a loading operational mode, the conveyor supplies cargo, such as boxes, to the robot which in turn stacks them (floor loads) in the trailer. In an unloading mode, the robot unstacks the boxes in the trailer and loads them onto the extendable outbound conveyor.

The cargo handling system as described and illustrated herein concerns a number of unique and inventive aspects. Some, but by no means all, of these unique aspects are summarized below.

Aspect 1 concerns an apparatus that includes a gantry and a robot arm. The gantry is configured to move from a retracted position to an extended position. The robot arm hangs from the gantry. The robot arm is configured to move along the gantry at least when the gantry is in the extended position. The robot arm is configured to handle one or more cargo items.

Aspect 2 concerns the apparatus of aspect 1, which further includes a conveyor configured to move from a retracted position to an extended position. The conveyor is configured to transport the cargo items to and/or from the robot arm.

Aspect 3 concerns the apparatus of aspects 1 or 2, which further includes a stabilizer mechanism attached to the gantry to stabilize the gantry when the gantry is at the extended position.

Aspect 4 concerns the apparatus of aspect 3, in which the cargo carrier has one or more sidewalls and a roof. The stabilizer mechanism is positioned to secure to the sidewalls and/or roof of the cargo carrier.

Aspect 5 concerns the apparatus of aspects 3 or 4, in which the stabilizer mechanism includes one or more vacuum cups configured to secure the gantry with vacuum force.

Aspect 6 concerns the apparatus of any one of aspects 1-5, in which the gantry includes one or more supports supporting the weight of the gantry. All of the supports are located at or inside of a loading dock.

Aspect 7 concerns the apparatus of aspect 6, in which at least one of the supports includes a gantry positioning mechanism configured to move the gantry to the extended position.

Aspect 8 concerns the apparatus of aspect 7, in which the gantry includes a guide rail. The gantry positioning mechanism includes a gantry drive wheel supporting the guide rail, and a gantry drive motor is configured to drive the gantry drive wheel to move the guide rail.

Aspect 9 concerns the apparatus of aspect 8, in which the robot arm includes a carriage with a carriage wheel riding on the guide rail. The guide rail has opposing channels. The gantry drive wheel and the carriage wheel are located in the opposing channels to minimize interference between the gantry drive wheel and the carriage wheel.

Aspect 10 concerns the apparatus of any one of aspects 6-9, in which the support is located in a wall of a loading dock to reduce impediments around the loading dock.

Aspect 11 concerns the apparatus of any one of aspects 1-10, which further includes a gantry alignment mechanism configured to align the gantry with a cargo carrier.

Aspect 12 concerns the apparatus of aspect 11, in which the alignment mechanism is configured to adjust tilt of the gantry.

Aspect 13 concerns the apparatus of any one of aspects 11 and 12, in which the alignment mechanism is configured to adjust height of the gantry.

Aspect 14 concerns the apparatus of any one of aspects 11-13, wherein the gantry includes one or more sensors configured to sense the position of the cargo carrier.

Aspect 15 concerns the apparatus of any one of aspects 1-14, in which the gantry is positioned closer to a ceiling than a floor of a cargo carrier when in the extended position.

Aspect 16 concerns the apparatus of any one of aspects 1-15, in which the gantry has a gantry height of at least 7 feet high.

Aspect 17 concerns the apparatus of any one of aspects 1-16, in which at least a portion of the gantry extends through a loading dock when in the extended position.

Aspect 18 concerns the apparatus of any one of aspects 1-17, in which at least a portion of the gantry extends over a portion of a cargo carrier when in the extended position.

Aspect 19 concerns the apparatus of any one of aspects 1-18, in which at least a portion of the gantry extends within a cargo space when in the extended position and the entire gantry is located outside of the cargo space when in the retracted position.

Aspect 20 concerns the apparatus of any one of aspects 1-19, wherein the robot arm includes an end of arm tool configured to handle the cargo items.

Aspect 21 concerns the apparatus of aspect 20, wherein the end of arm tool includes one or more forks to support the cargo items and one or more vacuum cups to stabilize the cargo items.

Aspect 22 concerns the apparatus of aspect 21, wherein the gantry includes one or more retraction mechanisms configured to retract the gantry to the retracted position when electrical power is lost.

Aspect 23 concerns a method of operating the apparatus of any preceding aspect.

Aspect 24 concerns a method. A gantry is extended to overlap with at least a portion of a cargo carrier. A robot arm is moved along the gantry above the cargo carrier. The robot arm hangs below the gantry. One or more cargo items associated with the cargo carrier are handled with the robot arm.

Aspect 25 concerns the method of any one of aspects 23 or 24, which further includes adjusting height of the gantry with a gantry positioning mechanism to compensate for the height of the cargo carrier.

Aspect 26 concerns the method of aspect 25, which further includes sensing the height of the cargo carrier with one or more sensors before adjusting the height.

Aspect 27 concerns the method of any one of aspects 23-26, which further includes adjusting tilt of the gantry with a gantry positioning mechanism to compensate for tilt of the cargo carrier.

Aspect 28 concerns the method of aspect 27, which further includes sensing the tilt of the cargo carrier with one or more sensors before adjusting the tilt.

Aspect 29 concerns the method of any one of aspects 23-28, which further includes extending a conveyor into the cargo space. One or more items are transported between the conveyor and a storage position inside the cargo carrier.

Aspect 30 concerns the method of any one of aspects 23-29, which further includes supporting the weight of the gantry and the robot arm with one or more supports located at a position outside of the cargo carrier.

Aspect 31 concerns the method of any one of aspects 23-30, which further includes stabilizing the gantry by detachably securing a distal end of the gantry to a ceiling and/or sidewall of the cargo carrier with a stabilizer mechanism.

Aspect 32 concerns the method of any one of aspects 23-31, in which the cargo carrier has sidewalls and a ceiling to form an enclosed cargo space. The gantry includes a robot support frame supporting the robot arm. At least a portion of the robot support frame is extended into the cargo space.

Aspect 33 concerns the method of any one of aspects 23-32, which further includes retracting the gantry with a retraction mechanism when power is lost.

Aspect 34 concerns the method of any one of aspects 23-33, which further includes sensing the cargo is moving with one or more sensors, and retracting the gantry from the cargo carrier in response to the sensing.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
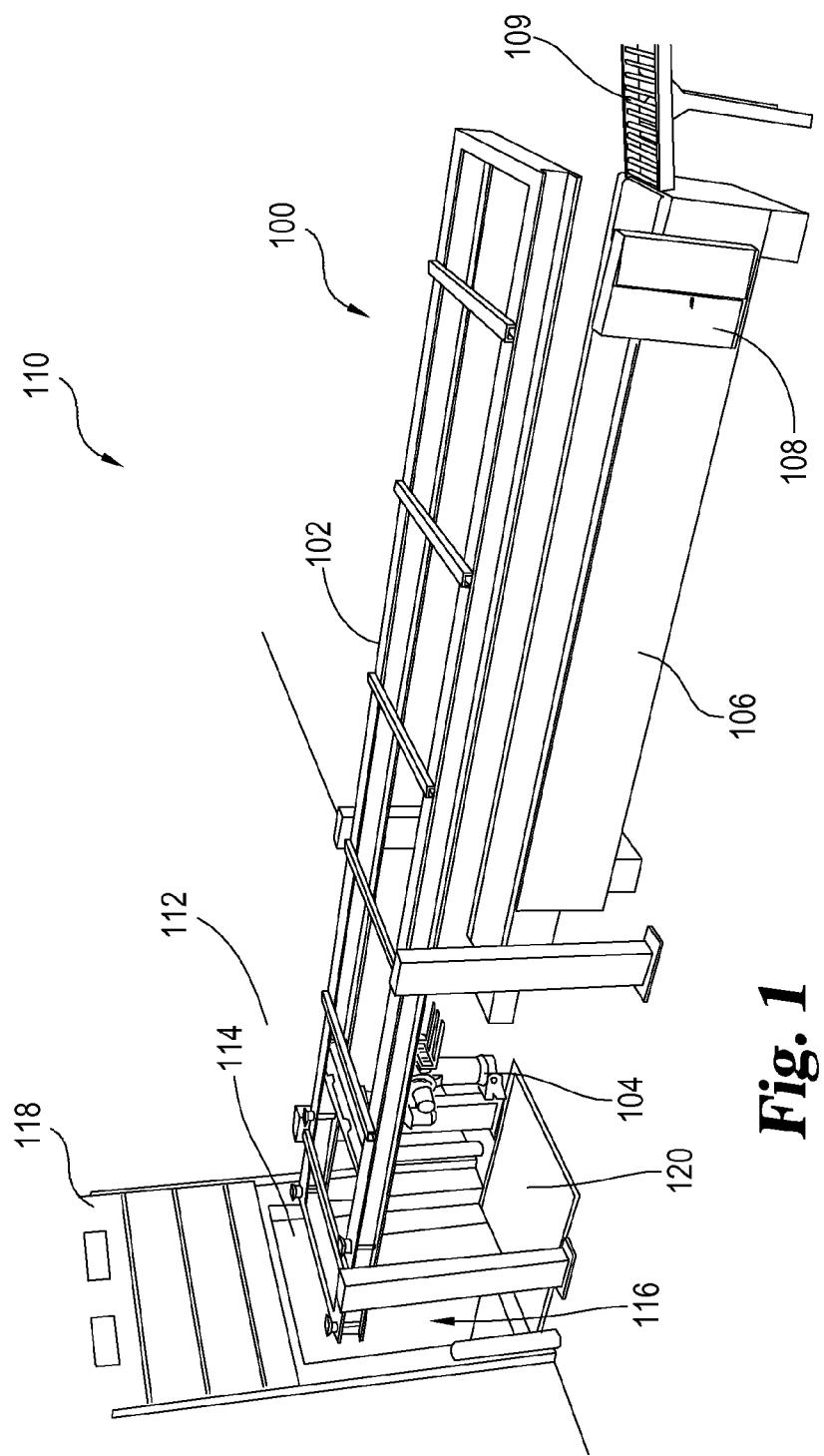
FIG. 1 is a perspective view of a cargo handling system located at a loading dock area.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

A perspective view of a cargo handling system 100 is illustrated in FIG. 1. As shown, the cargo handling system 100 includes an extendable gantry 102, a robot arm 104 that is configured to move along the gantry 102, and an extendable conveyor system 106 from where the robot 104 is able to load and/or unload cargo. A control system 108 controls the operation of the various components of the cargo handling system 100, such as the gantry 102, robot arm 104, and conveyor system 106. A transfer conveyor 109 can be used to transport items to and from the conveyor system 106. In other examples, the cargo items can be directly loaded onto the conveyor system 106, such as via a forklift truck or manually loaded. In the illustrated example, the cargo handling system 100 is shown located within a loading dock area 110 of a building, but it should be recognized that the cargo handling system 100 can be used in other types of environments, such as in other types of enclosed buildings, partially enclosed buildings, and structures fully open to the outside environment. The loading dock area 110 of the building has a wall 112 with one or more loading docks or bays 114. Each loading dock 114 has a loading dock opening 116 through which cargo is loaded into and/or unloaded from a cargo space. As depicted, the loading dock 114 further includes an overhead door 118 that is able to close the loading dock opening 116 and a dock leveler 120 that is a height adjustable platform used to bridge between the loading dock 114 and the cargo space. During use, the gantry 102 is extended through the loading dock opening 116 and into the cargo space so that the robot arm 104 is able to move freely within the cargo space to load and/or unload cargo. Alternatively or additionally, the conveyor system 106 can be extended through the loading dock 114 to be located inside the cargo space so as to reduce travel distance of the robot arm 104 when loading and/or unloading cargo from the cargo space.

Figure 2:
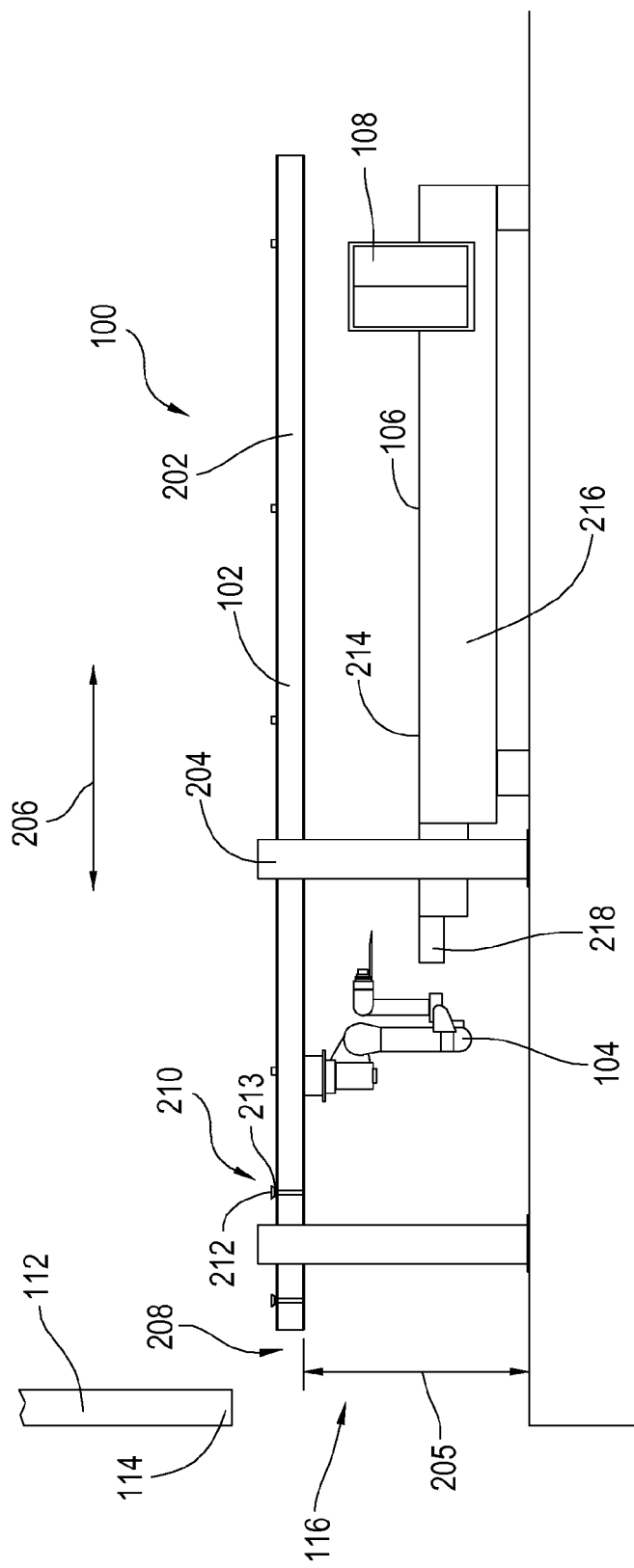
FIG. 2 is a side view of the FIG. 1 cargo handling system.

FIG. 2 shows a side view of the cargo handling system 100. As shown, the gantry 102 includes a robot support frame or jib 202 that is supported by one or more supports 204. In the illustrated example, the gantry system 102 has four supports 204, but it should be recognized that in other examples the gantry 102 can include more or less supports 204 than is shown (or even none). As indicated by the double arrow 206 in FIG. 2, the robot support frame 202 is able to move in a longitudinal direction relative to the supports 204 so as to extend and retract a cargo space end portion 208 of the robot support frame 202 through the loading dock opening 116. The robot support frame 202 is positioned high enough so as to not interfere with human access to the cargo space. In the illustrated example, the robot support frame 202 is raised closer to the top or header of the loading dock 114 than the floor. Consequently, when the robot support frame 202 is extended into the cargo space, the robot support frame 202 is positioned closer to the roof or ceiling of the cargo carrier than the floor of the cargo carrier. In one particular example, the gantry 102 has a gantry height 205, as measured from the floor to the bottom side of the robot support frame, of at least 7 feet (2.13 meters) high. Depending on a number of factors, such as the height of the loading dock 114 and access needs, the gantry 205 height can be higher or lower. At the cargo space end portion 208, the robot support frame 202 has a stabilizer mechanism 210 that stabilizes the robot support frame 202 when in a partially or fully extended state. While the stabilizer mechanism 210 does not support full weight of the robot support frame 202, the stabilizer mechanism 210 helps to minimize movement or bouncing of the robot support frame 202 as the robot arm 104 moves during operation. The stabilizer mechanism 210 is configured to engage the roof/ceiling and/or sidewalls of the cargo space so as to not interfere with human access to the cargo space floor. In the illustrated example, the stabilizer mechanism 210 is configured to engage the roof of the cargo space or container, but in other examples, the can engage the sidewalls of the cargo space. As depicted, the stabilizer mechanism 210 includes one or more vacuum cups 212 that are configured to secure to the roof of the cargo space and one or more actuators 213 configured to extend the vacuum cups 212 towards the roof of the cargo space. In one form, the actuators 213 include pneumatic or hydraulic pistons, but other types of devices, such as mechanical or electromagnetic actuators, can be used to move the vacuum cups 212 so as to engage the roof. In other examples, the stabilizer mechanism 210 can alternatively or additionally include other types of mechanisms for bracing the support frame 202, such as electromagnets and/or mechanical mechanisms (e.g., clamping mechanisms). The support frame 202 and other parts of the gantry 102 can include lighting in order to illuminate the cargo space.

Figure 3:
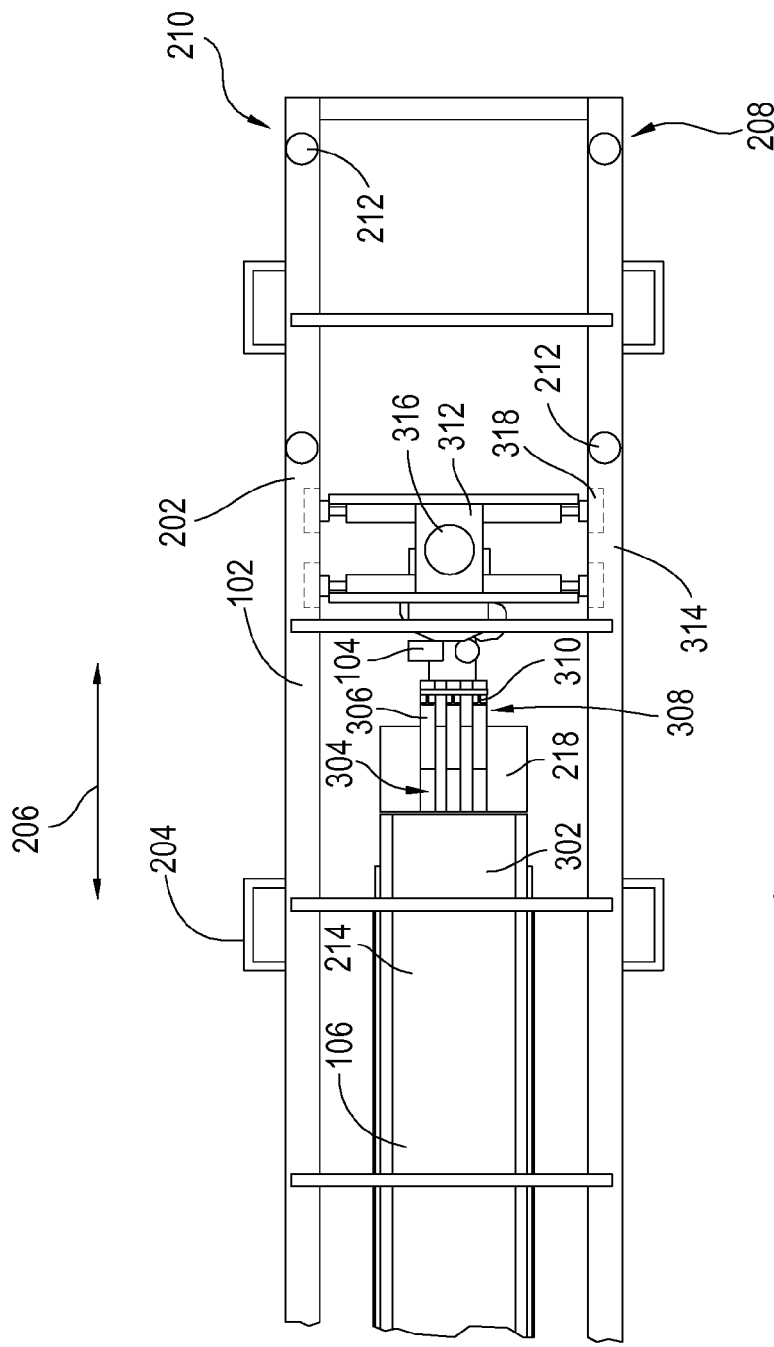
FIG. 3 is a top view of the FIG. 1 cargo handling system.

The conveyor system 106 includes a transport deck 214 on which the cargo is transported. The transport deck 214 is supported by a base 216. The transport deck 214 includes a transfer end portion 218 where the cargo interfaces with the robot arm 104. As indicated by double arrow 206, the transport deck 214 is able to extend and retract relative to the base 216 such that the transfer end portion 218 is able to extend inside and retract from the cargo space. Looking at FIG. 3, which shows a top view of a portion of the cargo handling system 100, the transport deck 214 includes a belt 302 that is powered in order to move the cargo items along the conveyor system 106. While the conveyor system 106 in the illustrated example is a belt type conveyor, it should be recognized that other types of conveyors, such as roller conveyors, can be used to transport cargo items. Moreover, all or part of the conveyor system 106 can be powered or unpowered. For instance, instead of relying on a belt that is powered by the motor, the conveyor system 106 in other examples can include unpowered rollers that utilize gravity to move items. As can be seen in FIG. 3, the transfer end portion 218 of the conveyor system 106 includes a series of grooves 304 that are configured to receive forks 306 located at an end of arm tool portion 308 of the robot arm 104. The depth of the grooves 304 is large enough so that the forks 306 can be located below or flush with the surface of the transfer end portion 218 so that any cargo, such as boxes, can readily slide on top of the forks 306 of the robot arm 104.

As shown in FIG. 3, the end of arm tool 308 of the robot arm 104, in addition to the forks 306, further includes vacuum cups 310 for stabilizing items, such as boxes, on the forks 306 as the cargo item is moved by the robot arm 104. The forks 306 are expandable or adjustable to accommodate differently sized items or different situations. The end of arm tool 308 can be configured differently in other examples. For instance, the end of arm tool 308 can include compression mechanisms, electromagnets, large vacuum cups, and/or other types of devices for stabilizing and/or securing items to the robot arm 104. In one example, the robot arm 104 is a five (5) axis robot arm, but in other examples, the robot arm 104 include more or less axes of movement. For instance, the robot arm 104 in other examples is a four (4) or six (6) axis robot arm. To move in a longitudinal direction 206, the robot arm 104 is coupled to a carriage 312 that rides along one or more guide rails 314 of the robot support frame 202. The robot arm 104 is able to rotate relative to the carriage 312 so as to be able to access all areas of the cargo space. The carriage 312 includes one or more drive motors 316 that power one or more carriage wheels 318 that ride along the guide rails 314 of the robot support frame 202. In the illustrated example, the carriage 312 has four (4) carriage wheels 318, but it should be recognized that the carriage 312 in other examples can include more or less carriage wheels 318. Likewise, although the drawings show the robot support frame 202 having two (2) guide rails 314, the robot support frame 202 in other examples can have more or less guide rails 314 (e.g., it can have a monorail construction).

Figure 4:
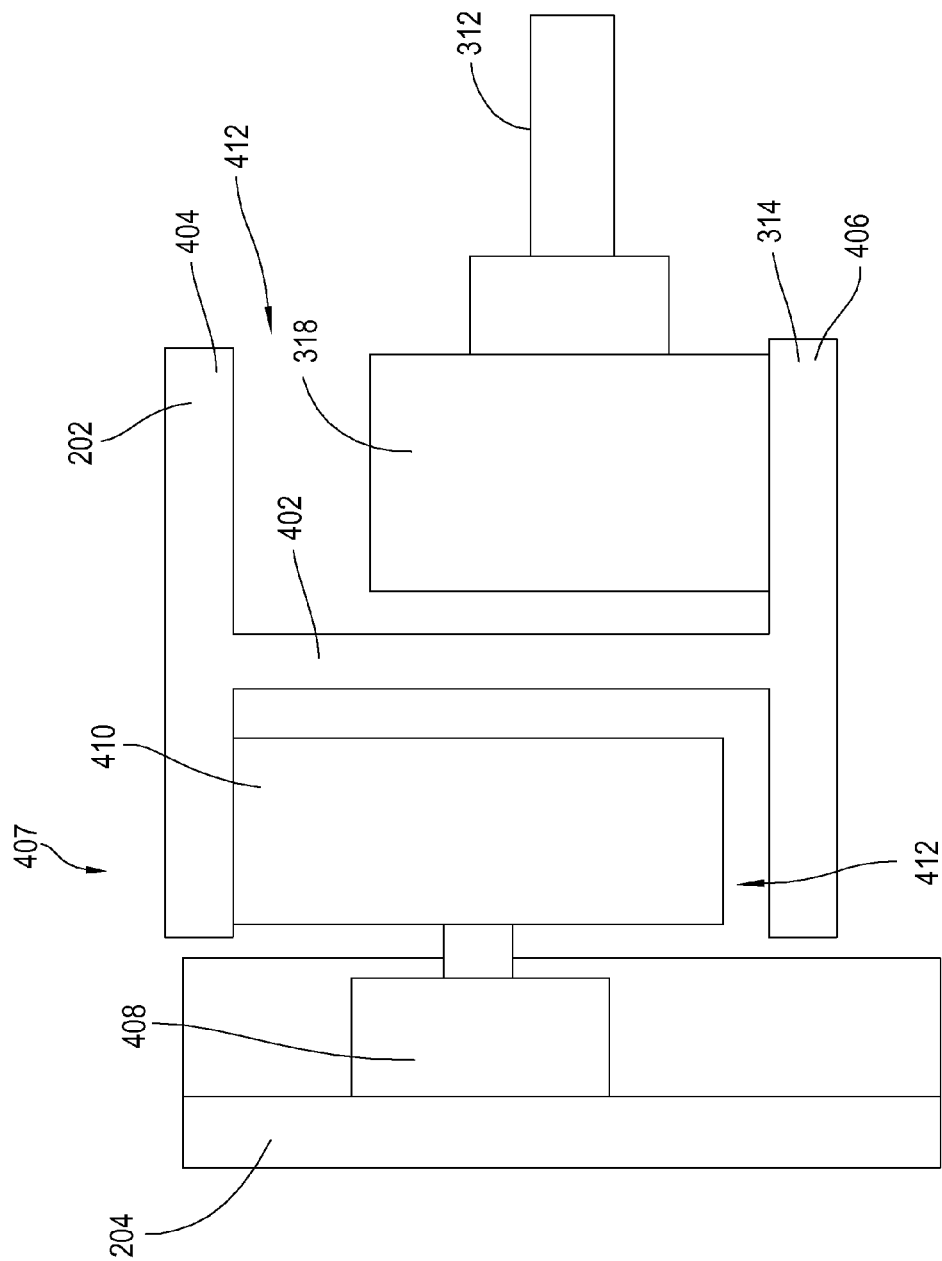
FIG. 4 is an enlarged cross-sectional view of a gantry interface in the FIG. 1 cargo handling system.

FIG. 4 shows an enlarged cross-sectional view of one example of how the carriage wheels 318 of the carriage 312 engage the guide rails 314 of the robot support frame 202. In the illustrated example, the guide rail 314 has an I-beam shape with a web 402 connecting upper 404 and lower 406 flanges. As can be seen, the carriage wheel 318 rides along the lower flange 406. It should be recognized that the guide rail 314 can have a different shape in other examples. For example, both the guide rails 314 and the carriage wheels 318 can include gearing or teeth so as to promote engagement between the two components. Moreover, the carriage 312 can be repositioned with other types of mechanisms such as through hydraulic/pneumatic pistons and/or electromagnetic levitation technology.

FIG. 4 also illustrates how the robot support frame 202 engages the supports 204. In particular, a gantry positioning mechanism 407 is used to support as well as move the robot support frame 202. As illustrated, the gantry positioning mechanism 407 includes a gantry drive motor 408 that rotates one or more gantry drive wheels 410. In one example, the gantry drive motor 408 is an electric motor, but in other examples, the gantry drive motor 408 includes hydraulic, pneumatic, and/or electromagnetic type motors. As shown, the upper flange 404 of the robot support frame 202 rests against the gantry drive wheel 410 such that the support 204 supports the weight of the robot support frame 202. It should be recognized that the gantry positioning mechanism 407 can be configured differently in other examples. For example, the gantry drive wheel 410 along with the upper flange 404 can include teeth or gearing to ensure proper relative positioning between the components. The control system 108 through the gantry drive motor 408 is able to extend or retract the robot support frame 202 by rotating the gantry drive wheel 410, and once in position, the positioning mechanism 407 is able to maintain the robot support frame 202 at the proper position. For instance, if any trailer creep occurs, the positioning mechanism 407 is able to reposition the robot support frame 202 so as to compensate for any incremental changes in position of the cargo space. It should be recognized that the gantry positioning mechanism 407 can be configured differently in other examples. For instance, the gantry positioning mechanism 407 in another example includes a high hydraulic piston that repositions the robot support frame 202. In still yet another example, the gantry positioning mechanism 407 utilizes electromagnetic levitation technology similar to electromagnetically driven trains.

As shown, the web 402 along with the flanges 404, 406 of the guide rail 314 define opposing channels 412 in which the carriage wheels 318 and the gantry drive wheels 410 ride. With the carriage wheels 318 and the gantry drive wheels 410 located on opposite sides of the web 402 within the opposing channels 412, the robot arm 104 is able to move without interfering with the movement of the robot support frame 202. This in turn allows the robot arm 104 to be able to move at different directions relative to the robot support frame 202 as the robot support frame 202 is extended, retracted, or held in place. For example, the carriage 312 of the robot support arm 104 can remain in place within the loading dock area 110 as the robot support frame 202 is extended within a cargo space. Once the robot support frame 202 is properly positioned within the cargo space, the robot arm 104 can then be moved within the cargo space. With this ability, damage to the robot arm 104 can be minimized, and the risk of injury to human personnel can be reduced.

Figure 5:
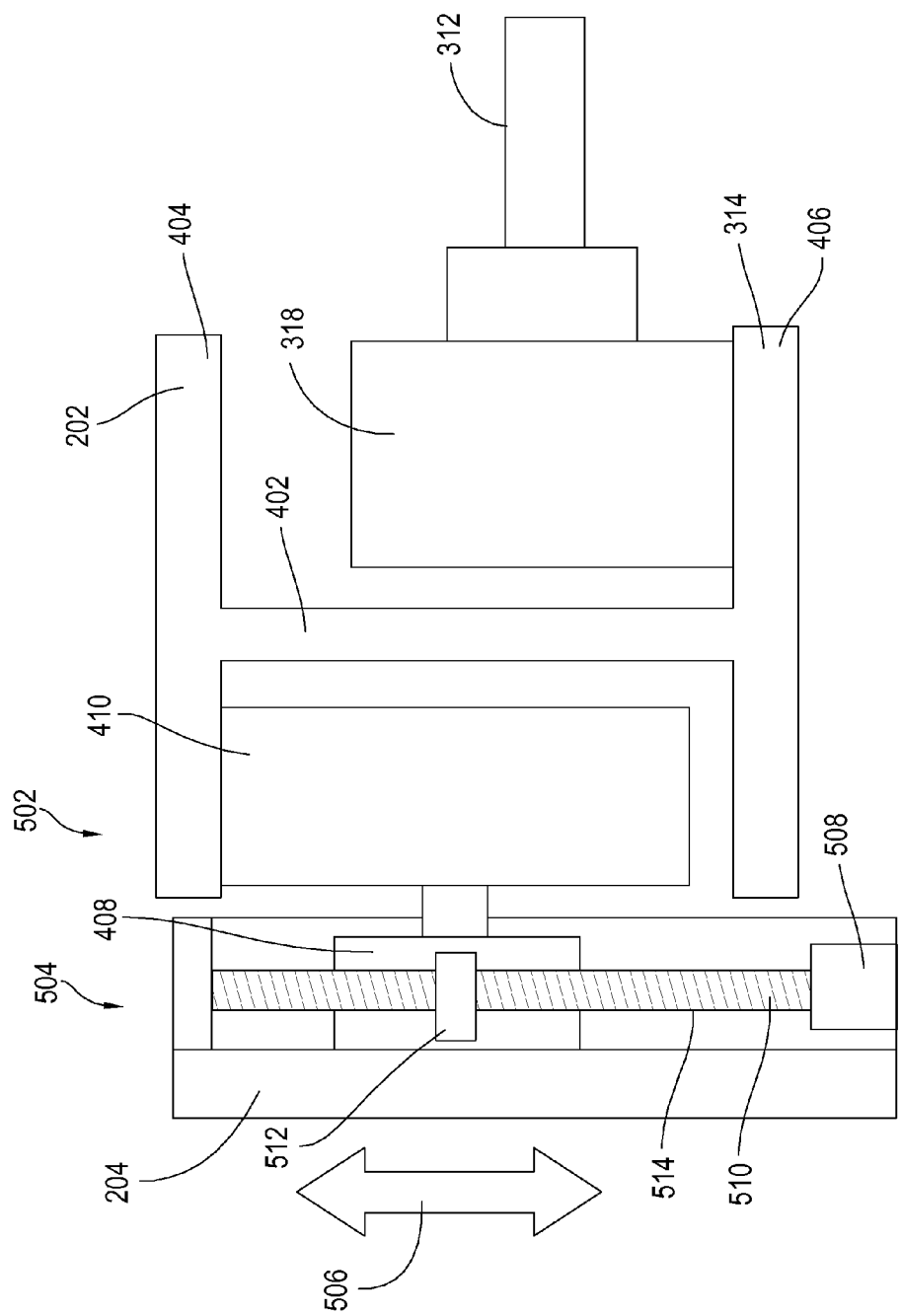
FIG. 5 is an enlarged cross-sectional view of a gantry positioning mechanism.

Not all cargo carriers, semitrailers, and the like have the same vertical dimensions, and when the semitrailer is positioned at the loading dock 114, the ground might not be level such that the semitrailer may be angled relative to the cargo handling system 100. To address these as well as other issues, a gantry positioning mechanism 502 depicted in FIG. 5 is configured to adjust the vertical height of the robot support frame 202 so as to compensate for differing vertical height of the cargo carriers as well as different angles of the cargo carriers relative to the loading dock 114. As can be seen in FIG. 5, the gantry positioning mechanism 502 includes a number of features in common with the examples described above. For the sake of clarity as well as brevity, these common features will not be described in detail, but please refer to the previous discussion of these particular features or components. Like the previous example, the gantry positioning mechanism 502 includes the gantry drive motor 408 and the gantry drive wheel 410. In addition, the gantry positioning mechanism 502 includes an alignment mechanism 504 that is configured to adjust or align the gantry 102 with the cargo space by adjusting the position of the robot support frame 202. In the illustrated example, the alignment mechanism 504 adjusts the vertical position of the robot support frame 202, as is indicated by double arrow 506, but in other variations, the alignment mechanism can be configured to adjust the alignment of the gantry in other directions, such as width, diagonally, horizontally, and/or side-to-side directions. In the illustrated example, the alignment mechanism 504 includes a vertical drive motor 508, a threaded shaft 510 and a drive collar 512. In the illustrated example, the drive motor 508 rotates the threaded shaft 510 that threadedly engages the drive collar 512 that is attached to the gantry drive motor 408. As the threaded shaft 510 is rotated, threads 514 on the shaft 510 cause the gantry drive motor 408 to move vertically 506 which in turn causes the robot support frame 202 to move vertically. In one example, the vertical drive motor 508 is an electric motor, but the vertical drive motor 508 can include other types of motors in other examples such as hydraulic and/or pneumatic motors. The alignment mechanism 504 can be configured differently in other embodiments. For example, the alignment mechanism 504 in other examples includes hydraulic/pneumatic pistons to vertically move the robot support frame 202.

Figure 6:
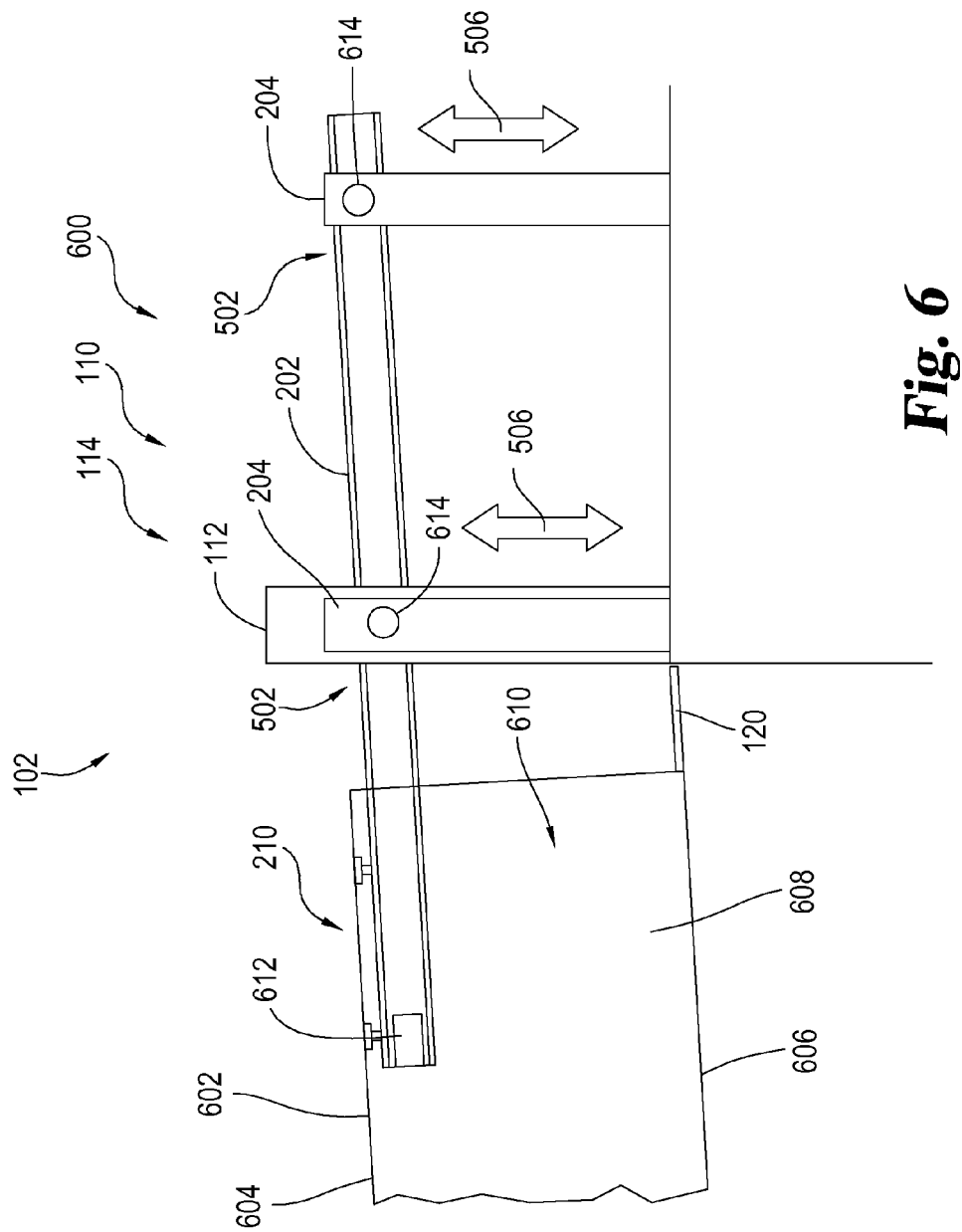
FIG. 6 is a cross-sectional view of a cargo handling system that incorporates the FIG. 5 gantry positioning mechanism.

FIG. 6 illustrates a cross-sectional side view of one example of a cargo handling system 600 that incorporates the gantry positioning mechanism 502 of FIG. 5. The cargo handling system 600 in FIG. 6 generally incorporates all the features described with respect to the cargo handling system 100 of FIG. 1 with a few notable distinctions. To free up space on the loading dock area 110 of the building, a pair of the supports 204 are incorporated or integrally formed in the wall 112 of the loading dock 114. The supports 204 can form at least part of the frame that defines the loading dock 114. With such a construction, the amount of space occupied by the cargo handling system 600 is reduced. Moreover, it creates less clutter or impediments in the loading dock area 110 which in turn can reduce collisions with forklifts and other systems. As illustrated, the other set or pair of supports 204 stand freely within the loading dock area 110. A cargo carrier 602 in the depicted example includes a ceiling or roof 604, a floor 606, and sidewalls 608 that at least in part form a cargo space 610. In the illustrated example, the cargo carrier 602 is positioned slightly lower and at an angle relative to the loading dock 114. While the dock leveler 120 is able to form a bridge between the loading dock 114 and the floor 606 of the cargo carrier 602, if left uncompensated, the robot support frame 202 would not be able to be properly inserted into the cargo carrier 602 without causing damage. The alignment mechanism 504 (FIG. 4) in the gantry positioning mechanism 502 allows the height and angle of the robot support frame 202 of the gantry 102 to be adjusted so as to properly engage the cargo carrier 602. As depicted in FIG. 6, both the height and angle of the robot support frame 202 is adjusted to coincide with the height and angle of the ceiling 604 of the cargo carrier 602. The gantry positioning mechanisms 502 at the various supports 204 are able to independently adjust the vertical height 506 of the robot support frame 202. Once properly positioned, the stabilizer mechanism 210 can engage the ceiling 604 of the cargo carrier 602 so as to reduce shaking of the gantry 102 as the robot arm 104 moves.

The cargo handling system 600 in FIG. 6 further includes one or more sensors 612. In the depicted example, the sensors 612 are positioned on opposite sides that are proximal to the end of the support frame 202 to provide a clear line of view, but alternatively or additionally, sensors 612 can be positioned elsewhere. These sensors 612 can be incorporated into other cargo handling systems described herein as well variations thereof. The sensors 612 in one example include cameras for a vision system, but the sensors 612 can include other types of sensors such as proximity sensors, ultrasonic type sensors, and laser type sensors, to name just a few examples. In one form, the sensors 612 are configured to detect the position of the cargo carrier 602. The sensors 612 are able to detect any clearance and/or interference issues with the cargo carrier 602 so the gantry positioning mechanism 502 can make appropriate adjustments. For example, if the height of the cargo carrier 602 is detected by the sensors 612 as being too low or lower than expected, the gantry positioning mechanism 502 can lower the support frame 202. When the cargo carrier 602 is too high, the gantry positioning mechanism 502 can raise the support frame 202. The sensors 612 can also detect the angle of the cargo carrier 602 so that the gantry positioning mechanism 502 can make appropriate adjustments. During loading or unloading of cargo, the weight of the cargo inside the cargo carrier 602 can change, which in turn can change the height and/or angle of the cargo carrier 602. The sensors 612 can sense these changes so that the gantry positioning mechanism 502 can take appropriate corrective actions. The sensors 612 are further configured to detect when the cargo carrier 602 is accidentally pulled away from the loading dock. The sensors 612 are able to sense any movement of the walls or ceiling 604 of the cargo carrier 602. When the sensors 612 detect movement indicative that the cargo carrier 602 is pulling away from the loading dock, the cargo handling system 600 can take corrective measures to minimize damage as well as injuries. For instance, when detected, the vacuum cups 212 can be disengaged from the cargo carrier 602, and the gantry positioning mechanism 502 can lower the support frame 202 so as to minimize damage.

As shown in FIG. 6, the cargo handling system 600 further includes one or more retraction mechanisms 614 that are normally biased so as to retract the support frame 202 to a retracted position (e.g., inside the loading dock). When the cargo handling system 600 loses electrical power, the retraction mechanism 614 automatically retracts to the support frame 202 so as to minimize damage as well as allow the cargo carrier 602 to be removed from the loading dock. The cargo handling system 600 in other examples can retract the support frame 202 semi-automatically, semi-manually, and manually. For instance, when power is lost in another variation of the cargo handling system, a user can activate or press a button, switch, or other interface device to activate the retraction mechanisms 614. The retraction mechanisms 614 in one form include one or more coil springs, which are similar to those commonly found in overhead doors, but the retraction mechanism 614 can be configured differently in other examples. By way of nonlimiting examples, the retraction mechanism 614 can include other mechanisms for storing energy when the support frame is extended, such as pneumatic systems, hydraulic systems, regenerative type electrical systems, and weights/gravity type systems, to name just a few. When the support frame 202 is extended, the retraction mechanism 614 stores part of the energy used to extend the support frame 202 as potential energy. For instance, when the retraction mechanism 614 includes a coil spring, the coil spring is wound to store the energy. The gantry drive motor 408 resists the retraction force applied by the retraction mechanism 614 when the support frame 202 is extended. Once power to the drive motor is lost, cut-off, or otherwise interrupted, the gantry drive motor 408 no longer resists the retraction force, and the retraction mechanism 614 retracts the support frame 202 (e.g., by the coil spring unwinding).

Figure 7:
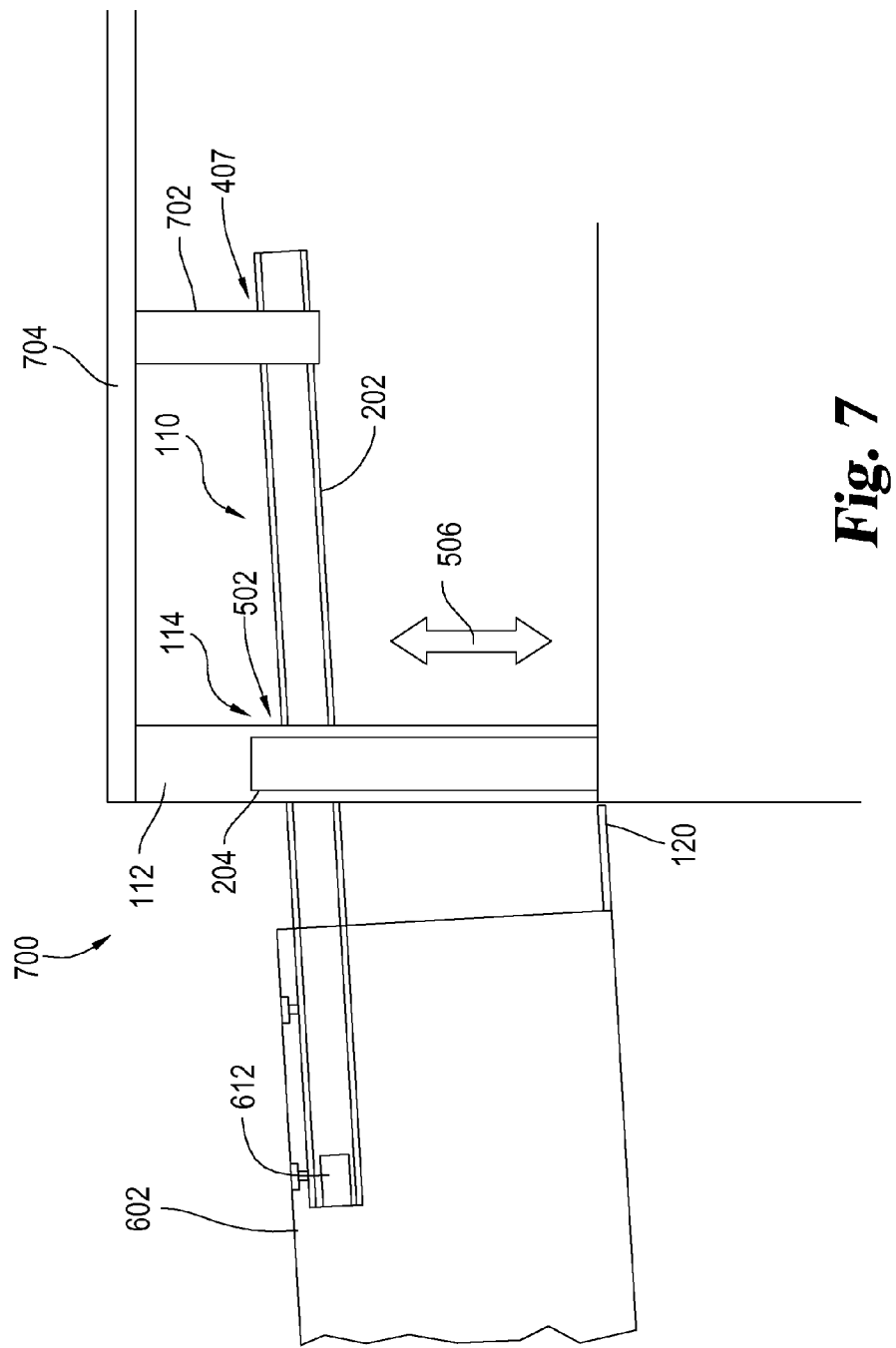
FIG. 7 is a cross-sectional view of another cargo handling system.

FIG. 7 illustrates another example of a cargo handling system 700 that is configured to further enhance access to the loading dock 114. As can be seen, the cargo handling system 700 shares a number of features in common with the previously described examples, and for the sake of brevity as well as clarity, these common components will not be discussed again below, but reference is made to the previous discussion of these components. To further free up floor space, one or more supports 702 in the cargo handling system 700 in FIG. 7 hang from one or more rafters 704 that are used to support the ceiling of the building. As can be seen, the supports 702 do not fully extend to the floor of the loading dock area 110. Instead, the end of the support 702 generally extends to the height of the robot support frame 202. The supports 702 in other variations can be configured differently. For instance, one or more supports in other variations can include gussets and/or special feet. In the illustrated example, the supports 702 include the gantry positioning mechanism 407 that is vertically fixed while the other set of supports 204 incorporates the gantry positioning mechanism 502 that includes the alignment mechanism 504 (FIG. 4). This cargo handling system 700 still is able to adjust the height and attack angle of the robot support frame so as to compensate for variations between the height and angle of the cargo carrier 602.

Figure 8:
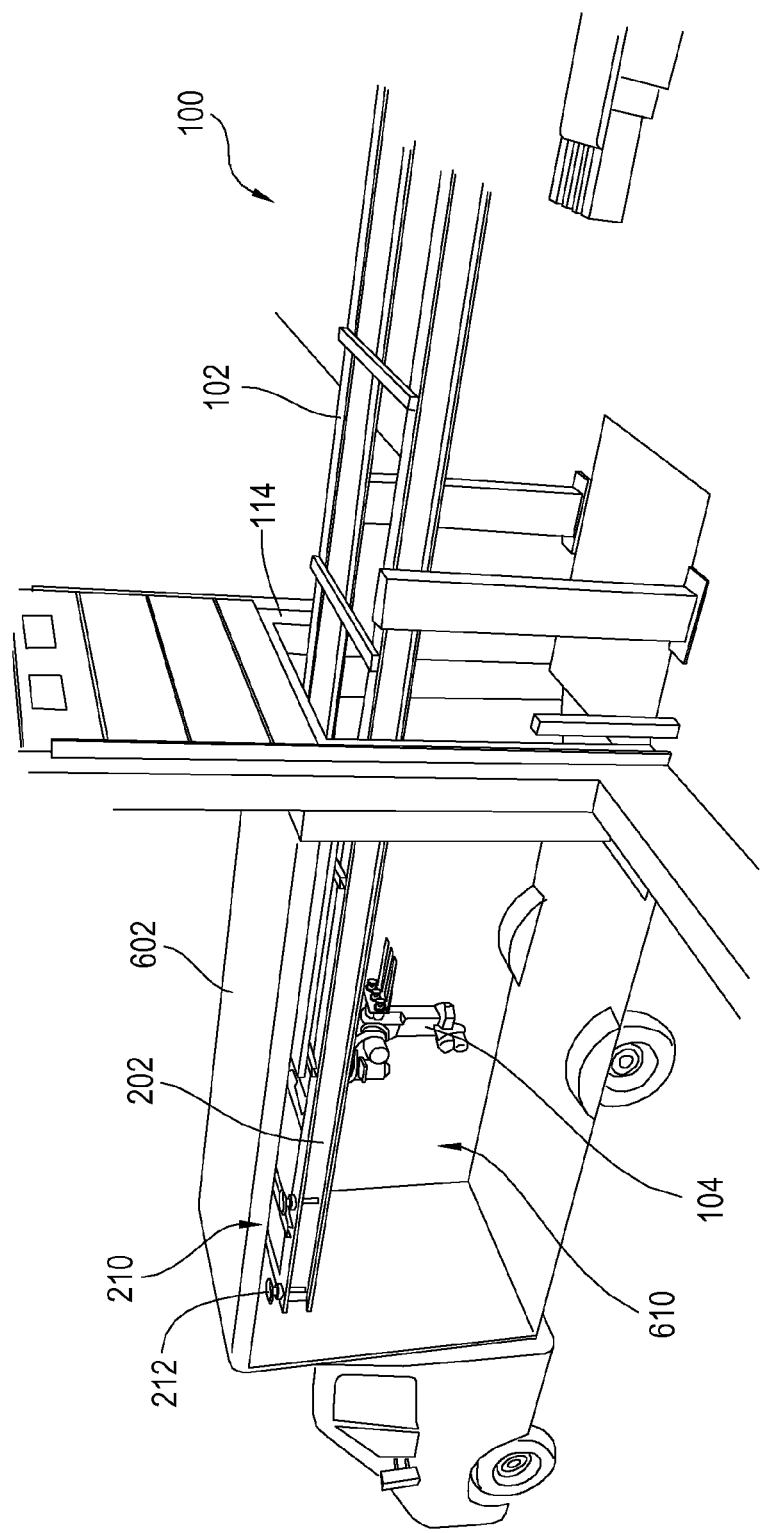
FIG. 8 is a perspective view of the FIG. 1 cargo handling system with a gantry in an extended position.

A technique for operating the cargo handling system 100 will now be described with reference to FIGS. 1 and 8-12. With this technique, the control system 108 controls the operation of the various components of the cargo handling system 100 that will be described below. This particular technique will be described with reference to loading cargo into the cargo space 610, but it should be recognized that this technique can be modified to perform other types of cargo handling operations, such as unloading or repositioning cargo items. Moreover, while the cargo carrier 602 in the drawings is depicted as being a truck, it should be recognized that other types of cargo carriers, such as semitrailers, flat bed truck trailers, intermodal storage containers, and the like, can be loaded and/or unloaded utilizing this technique. FIG. 1 shows the gantry 102 with the robot support frame 202 in a retracted position or state. Once the cargo carrier 602 is properly positioned and secured to the loading dock 114, the control system 108 extends the robot support frame 202 of the gantry 102 into the cargo space 610, as is depicted in FIG. 8. Depending on the requirements, the robot support frame 202 can be fully or partially extended into the cargo space 610. For instance, if the cargo space 610 already is partially or fully loaded with cargo items, the robot support frame 202 can be only partially (i.e., not fully) extended into the cargo space 610. In one variation, the robot arm 104 remains at a fixed position relative to the robot support frame 202 as the robot support frame 202 is extended into the cargo space 610 such that the robot arm 104 is likewise moved into the cargo carrier 602. In another variation, the robot arm 104 moves in a counter direction as the robot support frame 202 extends so as to remain outside of the cargo carrier 602 (i.e., in the loading dock area 110), and after the robot support frame 202 is extended to the desired position, the robot arm 104 then moves inside the cargo carrier 602.

Figure 9:
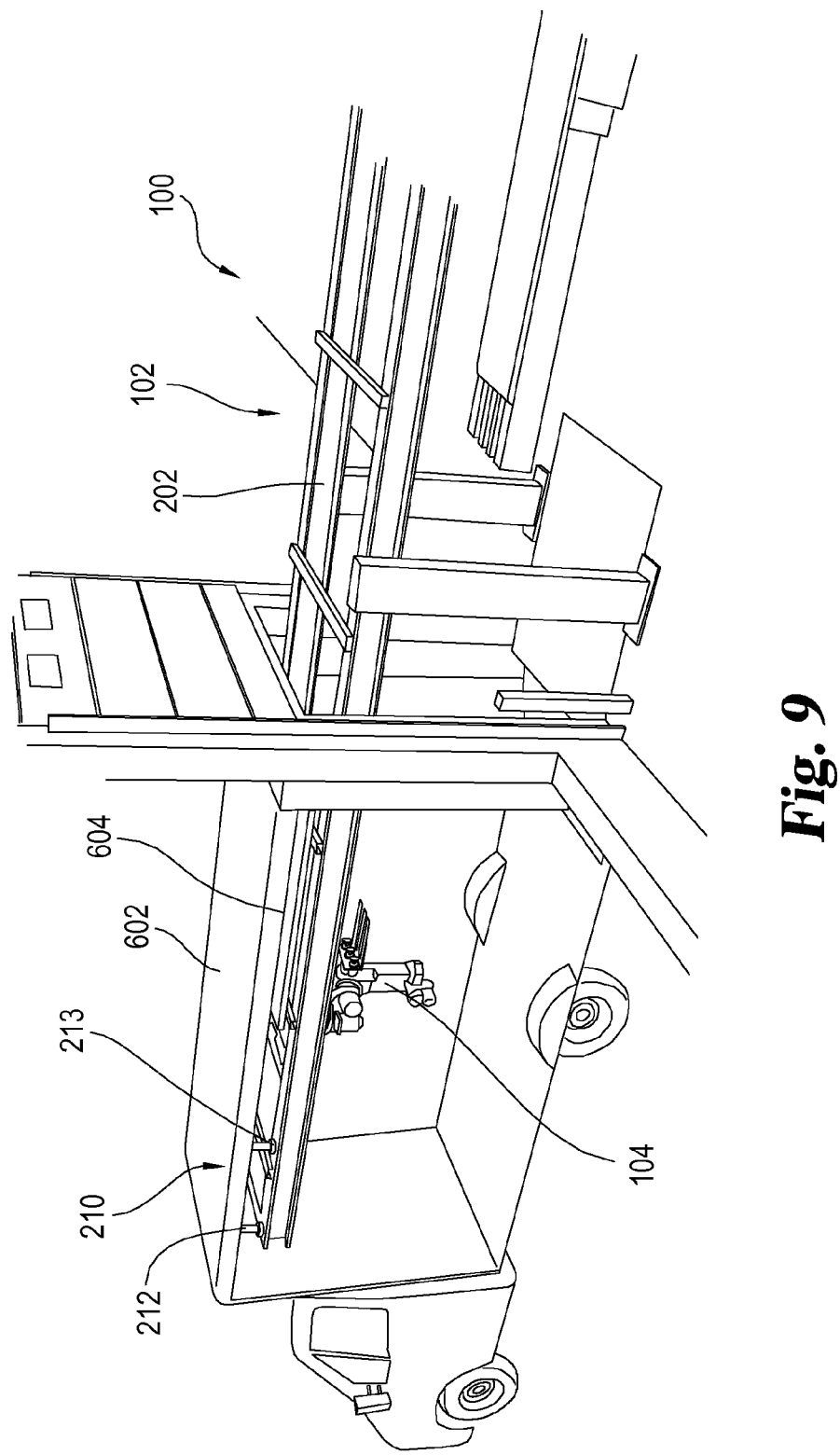
FIG. 9 is a perspective view of the FIG. 1 cargo handling system with a stabilizer mechanism of the gantry engaging a cargo carrier.
Figure 10:
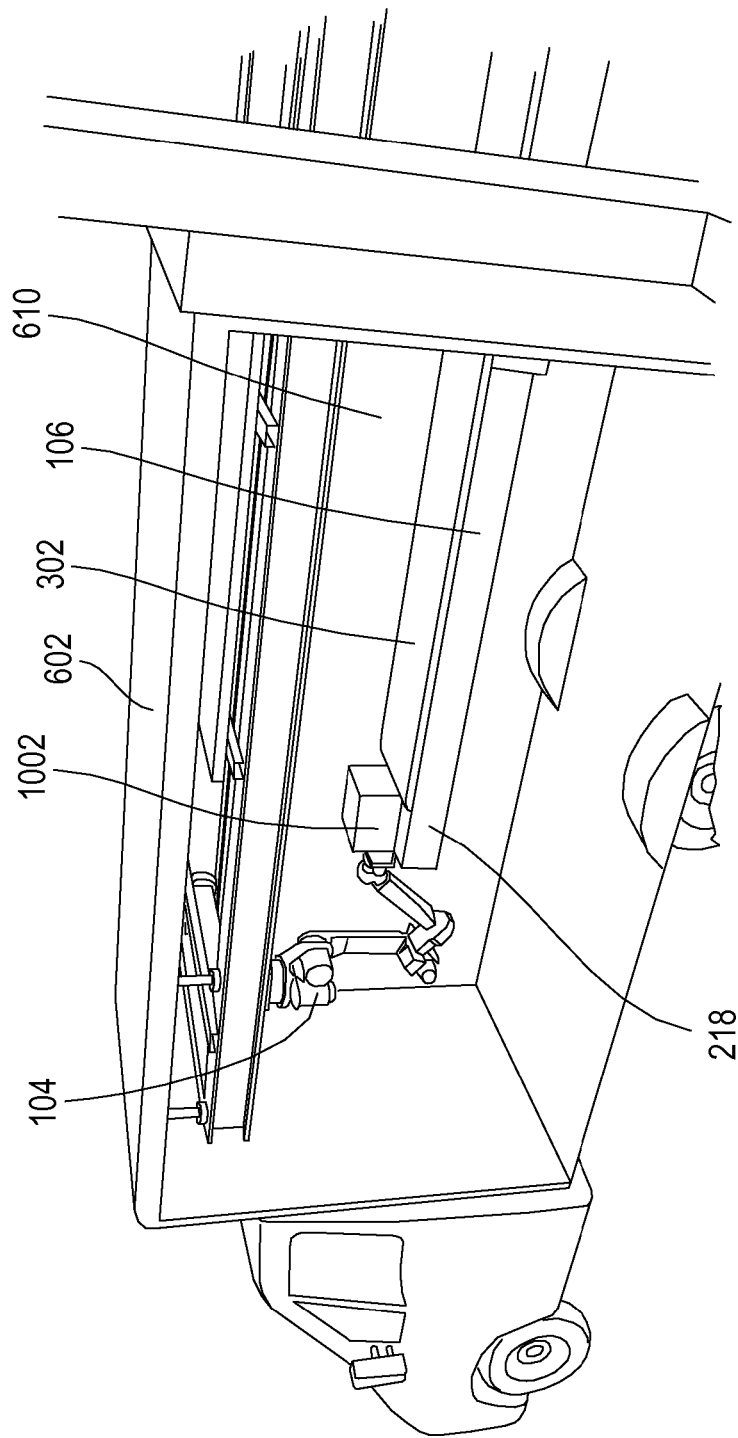
FIG. 10 is a perspective view of the FIG. 1 cargo handling system with a conveyor in an extended position.

As noted before, the robot support frame 202 can tend to flex or bounce when extended, especially as the robot arm 104 moves and/or carries a load. To address this issue, the gantry 102 includes the stabilizer mechanism 210. As illustrated in FIG. 9, the actuators 213 extend the vacuum cups 212, and the vacuum cups 212 draw suction (i.e., low pressure) in order to secure the extended end of the robot support frame 202 to the roof 604 of the cargo carrier 602. With the gantry 102 secured, the conveyor 106 is extended into the cargo space 610 of the cargo carrier 602, as is depicted in FIG. 10. In other variations, the conveyor 106 is extended into the cargo carrier 602 before or during extension of the gantry 102. Again, depending on a number of factors, such as how full the cargo carrier is and whether items are being loaded or unloaded, the conveyor 106 can be extended to different lengths within the cargo space 610. Once the transport deck 214 of the conveyor system 106 is extended to the proper position, the conveyor belt 302 is used to convey a cargo item 1002 to the transfer end portion 218 of the conveyor system 106. In the illustrated example, the cargo item 1002 is in the form of a box, but it should be recognized that the cargo item 1002 can be different in other examples. By way of nonlimiting examples, the cargo items 1002 can include bags, finished products, barrels, bales, bulk items, and pallets of items, to name just a few examples. Other factors can also impact the operation of the cargo handling system 100 and how as well as what type of cargo items 1002 are handled, such as weather, temperature, humidity, geography, and work space conditions. At transfer end portion 218 of the conveyor system 106, the robot arm 104 inserts the forks 306 into the grooves 304 of the transfer end portion 218 (FIG. 3) so that the forks 306 of the robot arm 104 are inserted underneath the cargo item 1002. In other examples, the forks 306 are inserted into the grooves 304 before the cargo item 1002 reaches the transfer end portion 218 of the conveyor system 106. The vacuum cups 310 at the end of arm tool 308 of the robot arm 104 draw suction in order to secure the cargo item 1002 to the robot arm 104.

Figure 11:
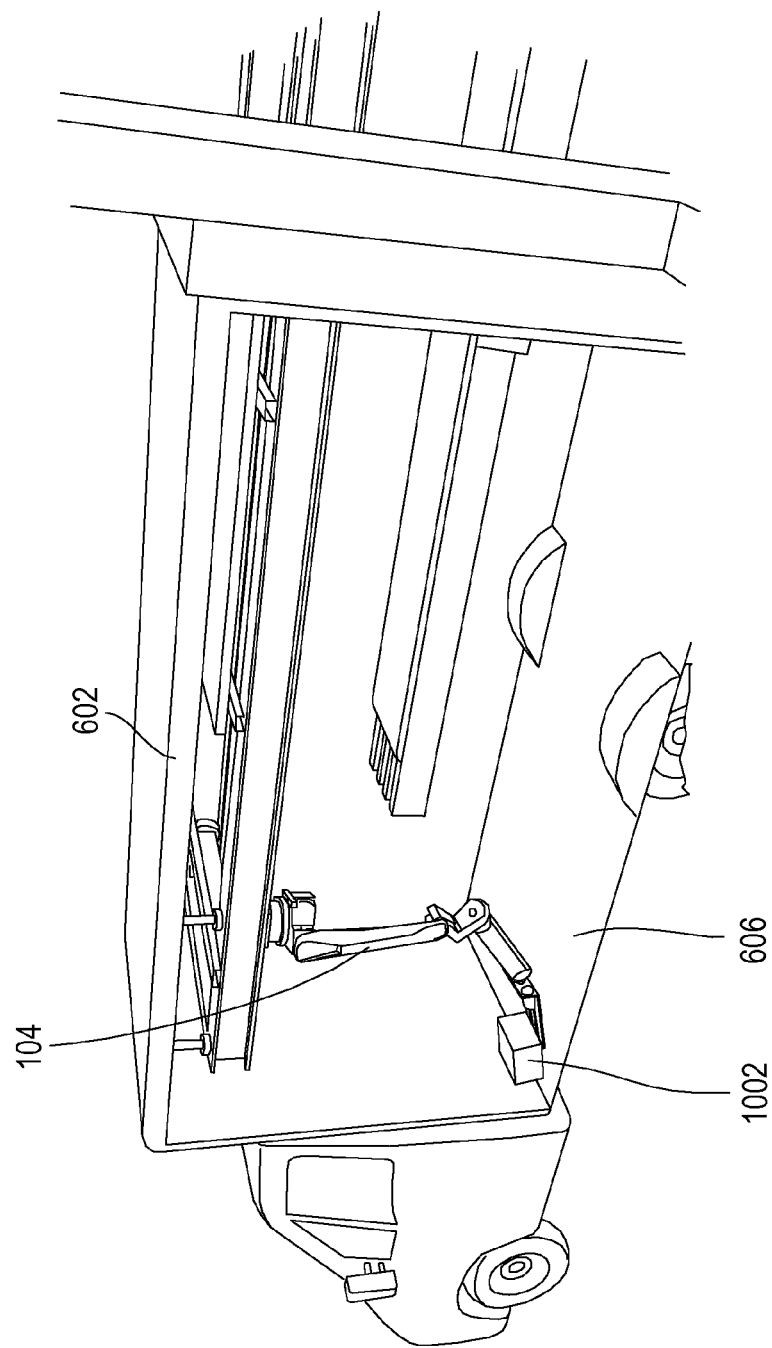
FIG. 11 is a perspective view of the FIG. 1 cargo handling system with a robot arm stacking cargo items into the cargo carrier.
Figure 12:
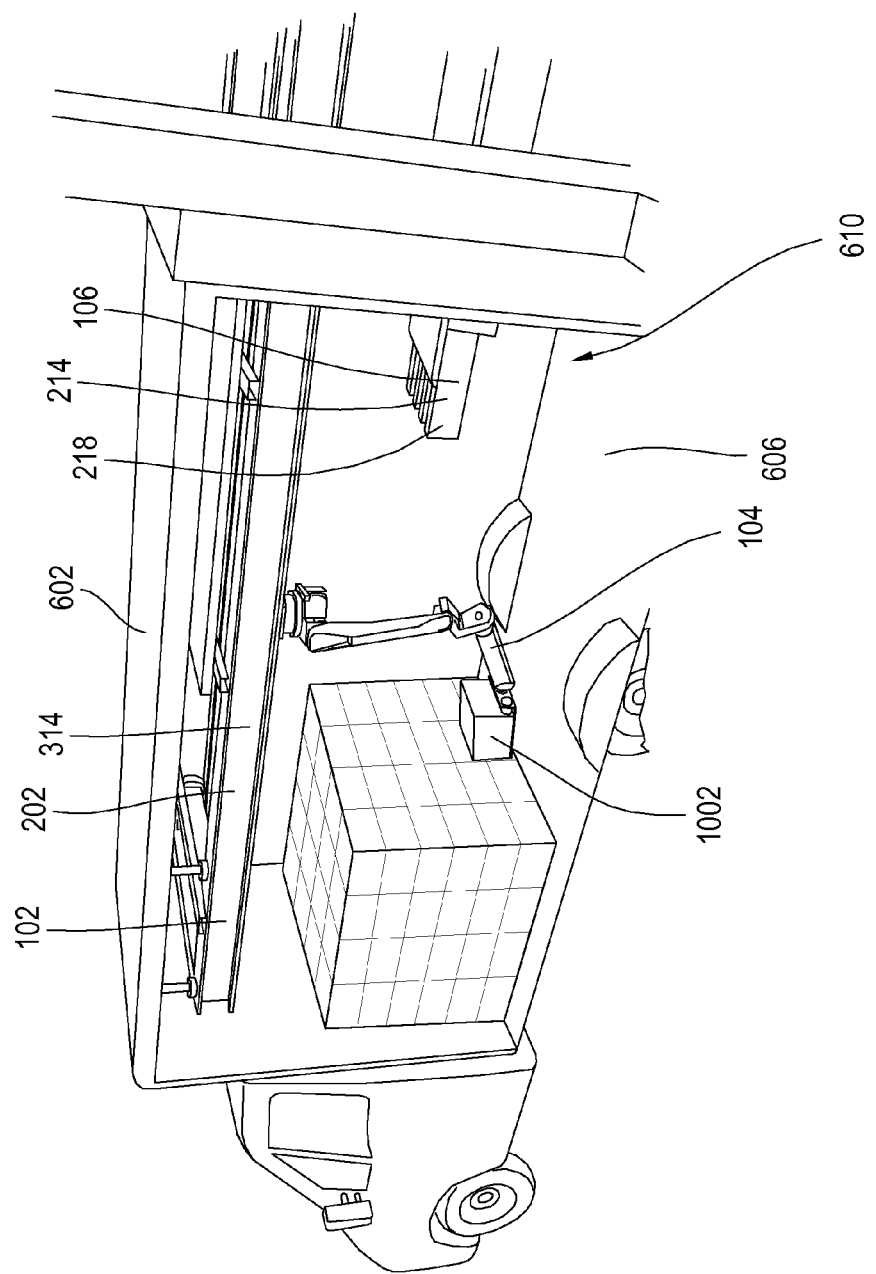
FIG. 12 is a perspective view of the FIG. 1 cargo handling system showing the robot arm and conveyor retracting as cargo items are loaded into the cargo carrier.

As shown in FIG. 11, the robot arm 104 then moves and, using a vision system, places the cargo item 1002 at the appropriate position, which in this case is the floor 606 of the cargo carrier 602, so as to load the cargo items 1002 into the cargo carrier 602. The robot arm 104 continues to stack the cargo items 1002, as is depicted in FIG. 12. As the cargo items 1002 fill the cargo space 610, the robot arm 104 retreats from the cargo space 610 by moving along the guide rails 314 of the gantry 102. Likewise, the transport deck 214 of the conveyor system 106 retracts from the cargo carrier 602 as the cargo space 610 fills with cargo items 1002. By being positioned proximal to the roof 604 of the cargo carrier 602, the robot support frame 202 keeps the floor 606 of the cargo carrier 602 clear so that human personnel can readily access the cargo space 610. In some cases, the human personnel can work alongside with the robot arm 104 and/or without the robot arm 104 to help address any issues that may occur during stacking of the cargo items 1002. For example, cargo items 1002 may shift during shipping such that some of the cargo items 1002 are knocked over and/or are improperly positioned for the robot arm 104 to unload the cargo items 1002. The human personnel in some cases can be used to manually unload the cargo items 1002 or assist in repositioning the cargo items 1002 so that the cargo items 1002 can be picked up by the robot arm 104. As another example, the personnel can enter the cargo space 610 for repairs of the cargo handling system 100. Having the robot arm 104 hang from the gantry 102 also facilitates access by other equipment such as forklifts, other robots, and other vehicles. Moreover, the weight of the cargo handling system 100 is not supported by the cargo carrier 602 which helps with a number of issues. For instance, smaller or lighter duty trucks can be loaded with the cargo handling system 100. Moreover, the dynamic forces created by the robot arm 104 as the robot arm 104 moves are not borne by the cargo carrier 602 which in turn helps to avoid shaking of the cargo carrier 602 during loading and/or unloading. With less shaking, the cargo items 1002 are less prone to dislodge or fall down. In the illustrated example, the robot support frame 202 remains in place during the entire operation. In other examples, the robot support frame 202 is also retracted as the cargo items 1002 fill the cargo space 610 so as to free up vertical space which allows the cargo items 1002 to be stacked higher.

To unload the cargo items 1002 from the cargo carrier 602, the above-described acts or steps are generally reversed. If space permits, the gantry 102 is extended into the cargo space 610 and the stabilizer mechanism 210 is used to stabilize the gantry 102. It should be appreciated that in other variations the stabilizer mechanism 210 can be optional or not used. The conveyor system 106 is extended so that the robot arm 104 is able to load the cargo items 1002 on to the conveyor system 106. As the robot arm 104 empties the cargo carrier 602, the robot arm 104 is able to travel further into the cargo space 610 by moving along the gantry 102. Likewise, as the cargo carrier 602 empties, the conveyor system 106 can further extend into the cargo space 610. If needed, the gantry 102 can also be extended further as cargo items 1002 are unloaded from the cargo carrier 602. It should be recognized that the cargo handling system 100 can be used to perform a number of different functions. For instance, the cargo handling system 100 can be used to reposition cargo items 1002 within the cargo carrier 602. The cargo handling system 100 can also be used to stage cargo items 1002 at the loading dock 114 before, during, and/or after loading or unloading of the cargo items 1002 from the cargo carrier 602. Once the desired operation is completed (e.g., loading or unloading of the cargo carrier 602), the gantry 102 along with the rest components of the cargo handling system 100 can be retracted back into the loading dock area 110, such as is depicted in FIG. 1.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to the following terms or common variations thereof:

Cargo or cargo items—is used in a broad sense to generally refer to goods or other physical objects that are typically carried or otherwise transported on vehicles, such as on trucks, ships, aircraft, spacecraft, and/or motor vehicles. The cargo items can be unpackaged or packaged, such as in boxes, bags, bales, containers, barrels, and tanks, to name just a few examples.

Cargo carrier—generally refers to any structure used to transport and/or store cargo items, such as flatbed trailers, trailers, semitrailers, trucks, intermodal containers, refrigerated trailers, and railcars, to just name a few examples. The cargo carrier can be transported in any number of ways, such as over land, sea, space, and/or air. Certain type of cargo carriers, like intermodal containers, are designed to be transported in a number of manners, such as via a truck, in a ship, and via rail. The cargo carrier can be fully enclosed, such as when in the form of a semi-trailer or cargo container, or open to the outside environment, such as with a flatbed trailer.

Extended position—generally refers to a location or state of the gantry and/or conveyor where at least a portion is stretched out to be longer or bigger. For example, when in the extended position, at least a portion of the gantry and/or conveyor extends through a loading dock and/or over (or inside) a portion of a cargo carrier. When in the extended position, the gantry and/or conveyor does not need to be stretched to the fullest extent possible (i.e., fully extended), but instead, it can be partly lengthened or enlarged (i.e., partially extended). Depending on the configuration of the cargo carrier, the gantry and/or conveyor will extend inside the cargo carrier, such as with an enclosed semi-trailer, or over the cargo carrier, such as with a flatbed trailer.

Gantry—generally refers to a frame or other structure raised on supports so as to span over, around, and/or into something. The supports and frame structure can come in many forms. For instance, the supports can be independent structures or incorporated to form a unitary structure. By way of a non-limiting example, the supports can be incorporated into the structure of the building in which the gantry normally resides.

Loading dock—generally refers to an area of a building or other structure where cargo items for cargo carriers (usually, but not always, road, rail, or sea) are loaded and unloaded. Cargo items can be also staged at the loading dock. Loading docks are commonly found on commercial and industrial buildings, and warehouses in particular. Loading docks may be exterior, flush with the building envelope, or fully enclosed. Loading docks are not just limited to fully enclosed buildings, but instead, can be located at locations that are partially or fully open to the outside environment.

Retracted position—generally refers to a location or state of the gantry and/or conveyor where it is withdrawn back. For example, when in the retracted position, the entire gantry and/or conveyor is located outside of the cargo carrier and/or inside of the loading dock. In other words, nothing of the gantry and/or conveyor extends outside of the loading dock so as to be located inside (or overlap with) the cargo carrier. When in the retracted position, the gantry and/or conveyor is typically shorter than when in the extended position.

Robot arm—generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "end of arm tool" (EoAT) for holding, manipulating, or otherwise interacting with the cargo items or other objects. The EoAT can be configured in many forms besides what is shown and described herein.

It should be noted that the singular forms "a", "an", "the", and the like as used in the description and/or the claims include the plural forms unless expressly discussed otherwise. For example, if the specification and/or claims refer to "a device" or "the device", it includes one or more of such devices.

It should be noted that directional terms, such as "up", "down", "top" "bottom", "lateral", "longitudinal", "radial", "circumferential", etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. An apparatus, comprising:
a gantry configured to move from a retracted position to an extended position, wherein the gantry includes one or more supports located inside of a loading dock, wherein the gantry extends outside of the loading dock when in the extended position; and
a robot arm hanging from the gantry, wherein the robot arm is configured to move along the gantry at least when the gantry is in the extended position, wherein the robot arm is configured to handle one or more cargo items, wherein all of the weight of the gantry and the robot arm are supported by the supports when the gantry is in the extended position.

2. The apparatus of claim 1, further comprising:
a conveyor configured to move from a retracted position to an extended position, wherein the conveyor is configured to transport the cargo items.

3. The apparatus of claim 1, further comprising:
a stabilizer mechanism attached to the gantry to stabilize the gantry when the gantry is at the extended position.

4. The apparatus of claim 3, further comprising:
a cargo carrier having one or more sidewalls and a roof and wherein the stabilizer mechanism is positioned to secure to at least one of the sidewalls and the roof of the cargo carrier.

5. The apparatus of claim 4, wherein the stabilizer mechanism includes one or more vacuum cups configured to secure the gantry with vacuum force to at least one of the sidewalls and the roof of the cargo carrier.

6. The apparatus of claim 1, wherein at least one of the supports includes a gantry positioning mechanism configured to move the gantry to the extended position.

7. The apparatus of claim 6, wherein:
the gantry includes a guide rail; and
the gantry positioning mechanism includes
a gantry drive wheel supporting the guide rail, and
a gantry drive motor is configured to drive the gantry drive wheel to move the guide rail.

8. The apparatus of claim 7, wherein:
the robot arm includes a carriage with a carriage wheel riding on the guide rail;
the guide rail has opposing channels; and
the gantry drive wheel and the carriage wheel are located in the opposing channels to minimize interference between the gantry drive wheel and the carriage wheel.

9. The apparatus of claim 1, wherein the support is located in a wall of a loading dock to reduce impediments around the loading dock.

10. The apparatus of claim 1, further comprising a gantry alignment mechanism configured to align the gantry with a cargo carrier.

11. The apparatus of claim 10, wherein the alignment mechanism is configured to adjust tilt of the gantry.

12. The apparatus of claim 10, wherein the alignment mechanism is configured to adjust height of the gantry.

13. The apparatus of claim 10, wherein the gantry includes one or more sensors configured to sense the position of the cargo carrier.

14. The apparatus of claim 1, wherein the gantry is positioned closer to a ceiling than a floor of a cargo carrier when in the extended position.

15. The apparatus of claim 1, wherein the gantry has a gantry height of at least 7 feet (2.13 m) high.

16. The apparatus of claim 1, wherein at least a portion of the gantry extends through a loading dock when in the extended position.

17. The apparatus of claim 1, wherein at least a portion of the gantry extends over a portion of a cargo carrier when in the extended position.

18. The apparatus of claim 1, wherein at least a portion of the gantry extends within a cargo space when in the extended position and the entire gantry is located outside of the cargo space when in the retracted position.

19. The apparatus of claim 1, wherein the robot arm includes an end of arm tool configured to handle the cargo items.

20. The apparatus of claim 19, wherein the end of arm tool includes one or more forks to support the cargo items and one or more vacuum cups to stabilize the cargo items.

21. The apparatus of claim 20, wherein the gantry includes one or more retraction mechanisms configured to retract the gantry to the retracted position when power is lost.

22. An apparatus, comprising:
a gantry configured to move from a retracted position where the gantry is positioned outside a cargo carrier to an extended position where the gantry is positioned inside the cargo carrier; and
a robot arm hanging from the gantry, wherein the robot arm is configured to move along the gantry at least when the gantry is in the extended position, wherein the robot arm is configured to handle one or more cargo items, wherein the robot arm and the gantry are entirely supported outside of the cargo carrier when the gantry is in the extended position.

23. The apparatus of claim 22, further comprising a support supporting the gantry that is located in a wall of a loading dock.

24. The apparatus of claim 22, further comprising:
a conveyor configured to move from a retracted position to an extended position, wherein the conveyor is configured to transport the cargo items; and
a gantry positioning mechanism coupled to the gantry to move the gantry to the extended position.

25. The apparatus of claim 24, further comprising a gantry alignment mechanism coupled to the gantry to align the gantry with the cargo carrier.

26. The apparatus of claim 25, wherein the gantry includes one or more sensors configured to sense the position of the cargo carrier.

27. The apparatus of claim 24, wherein the gantry has a gantry height of at least 7 feet (2.13 m) high.

28. An apparatus, comprising:
a gantry configured to move in a longitudinal direction from a retracted position where the gantry is positioned outside a cargo carrier to an extended position where at least a portion of the gantry extends inside the cargo carrier;
a carriage having
    one or more carriage wheels riding along the gantry, and
    one or more drive motors powering the carriage wheels to move the carriage relative to the gantry in the longitudinal direction; and
a robot arm hanging underneath the gantry when in the extended position inside the cargo carrier, wherein the robot arm is directly coupled to the carriage, wherein the robot arm via the carriage is configured to move in the longitudinal direction along the gantry at least when the gantry is in the extended position, wherein the robot arm is configured to handle one or more cargo items.

29. The apparatus of claim 28, further comprising one or more supports located at or inside of a building, wherein all of the weight of the gantry, the carriage, and the robot arm are supported by the supports.

30. The apparatus of claim 28, further comprising:
    a conveyor configured to move from a retracted position to an extended position, wherein the conveyor is configured to transport the cargo items; and
    a gantry positioning mechanism coupled to the gantry to move the gantry to the extended position.

31. The apparatus of claim 30, further comprising a gantry alignment mechanism coupled to the gantry to align the gantry with cargo carrier.

32. The apparatus of claim 31, wherein the gantry includes one or more sensors configured to sense the position of the cargo carrier.

33. The apparatus of claim 30, wherein:
    the gantry includes a guide rail; and
    the gantry positioning mechanism includes
        a gantry drive wheel supporting the guide rail, and
        a gantry drive motor is configured to drive the gantry drive wheel to move the guide rail.

34. The apparatus of claim 28, wherein the gantry has a gantry height of at least 7 feet (2.13 m) high.

* * * * *

UNITED STATES PATENT AND TRADEMARK OFFICE
CERTIFICATE OF CORRECTION

PATENT NO. : 9,950,881 B2  
APPLICATION NO. : 14/478557  
DATED : April 24, 2018  
INVENTOR(S) : William A. Bastian, II Page 1 of 1

It is certified that error appears in the above-identified patent and that said Letters Patent is hereby corrected as shown below:

On the Title Page

Item (73), replace "Soluitons" with --Solutions--

Signed and Sealed this  
Nineteenth Day of June, 2018

Andrei Iancu  
*Director of the United States Patent and Trademark Office*